United States Patent Office 3,377,354
Patented Apr. 9, 1968

3,377,354
FATTY ACID DI-PIPERIDIDES
Francis E. Cislak, Frank A. Karnatz, and Gray A. Shaw, Indianapolis, Ind., assignors to Reilly Tar & Chemical Corporation, Indianapolis, Ind., a corporation of Indiana
No Drawing. Filed May 24, 1965, Ser. No. 458,390
4 Claims. (Cl. 260—294)

ABSTRACT OF THE DISCLOSURE

Long chain fatty acid amides of dipiperidyl alkanes were prepared by the interaction of a dipiperidyl alkane with a carboxylic acid, its ester or acid chloride according to known methods. The fatty acid dipiperidides formed are wax-like solids useful as plasticizers, mold release agents and rust preventives.

---

This invention relates to a new composition of matter. More specifically, it relates to a new class of organic compounds.

The new class of organic compounds which are the subject matter of our present invention are fatty acid di-piperidides of dipiperidyl alkanes. These new di-piperidides have the formula

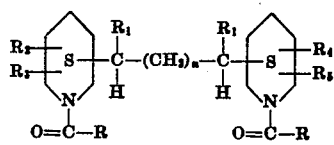

wherein R represents an alkyl or an alkenyl radical having from 9 to 29 carbon atoms; $R_1$, $R_2$, $R_3$, $R_4$, and $R_5$ represent hydrogen or lower alkyl, they may be alike or they may be different; $n$ is a small integer from 0 to 4. The fatty acid dipiperidides are wax-like solids useful as plasticizers, mold release agents, rust preventives, etc.

By the term "fatty acid" we mean monobasic aliphatic compounds having a single carboxyl group attached to the end of a straight hydrocarbon chain.

In general, our new class of compounds may be prepared by the interaction of a dipiperidyl alkane with a carboxylic acid, a carboxylic acid ester, or a carboxylic acid chloride.

Because of their superior thermal stability and low volatility, our fatty acid di-piperidides are useful as plasticizers for polyvinylchloride used in high temperature wire insulation. From about 10 to about 50 parts of the plasticizer are used for each 100 parts of polyvinylchloride.

Our fatty acid di-piperidides are useful in the compounding of rubber. They act as internal lubricants. They are particularly useful in the compounding of ABS rubbers.

The fatty acid di-piperidides of our invention are useful as antiblock agents in plastic and wax formulations to reduce tack, in printing inks and anti-offset and anti-scratch agents. They are useful in the rubber industry as mold release agents.

A solution of 5% to 10% of our fatty acid dipiperidides in an aromatic solvent is useful as a rust preventive coating on steel.

The manner in which the compounds of our invention may be prepared is illustrated by the following examples. It is to be understood that these examples are given by way of illustration only and are not intended as a limitation upon our invention.

Example 1.—N,N'-di-stearoyl-1,3-di-4-piperidylpropane

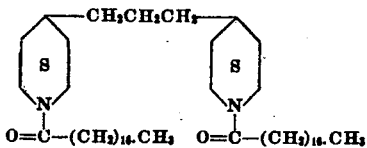

Into a flask equipped with a stirrer and a condenser connected to a Dean trap, is placed 105 grams of 1,3-di-4-piperidylpropane, 284 grams of stearic acid (95% grade), and 30 ml. of toluene. The reaction mixture is heated, thereby causing a reaction to occur, whereby water is evolved and N,N'-di-stearoyl-1,3-di-4-piperidylpropane is formed. The heating is continued at a temperature of about 250° C. until 18 cc. of water has been collected in the Dean trap. Then the reaction mixture is subjected to distillation under vacuum to remove any residual water and toluene. The residue, which is the N,N'-di-stearoyl-1,3,-di-4-piperidylpropane, is poured into a shallow pan and allowed to cool.

The N,N'-di-stearoyl-1,3-di-4-piperidylpropane has a freezing point of about 65°–70° C. It is freely soluble in benzene and other aromatic solvents. It is only moderately soluble in isopropanol, or petroleum naphthas. It is thermally stable at temperatures in excess of 300° C.

Example 2.—N,N'-di-stearoyl-1,3-di-2-piperidylpropane

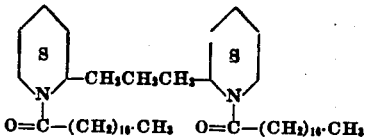

The procedure of Example 1 is repeated with the exception that we use 105 grams of 1,3-di-2-piperidylpropane in place of the 1,3-di-4-piperidylpropane.

Example 3.—1,2-(N-stearoylpiperidyl)-3,4-(N-stearoylpiperidyl)propane

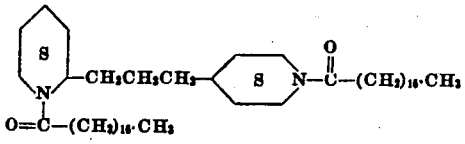

The procedure of Example 1 is repeated with the exception that we use 105 grams of 1,2-piperidyl-3,4-piperidyl propane in place of the 1,3-di-4-piperidylpropane.

Example 4.—N,N'-di-lauroyl-1,3-di-4-piperidylpropane

The procedure of Example 1 is repeated with the exception that we use 200 grams of lauric acid in place of the 284 grams of stearic acid.

The N,N'-di-lauroyl-1,3-di-4-piperidylpropane has a freezing point of about 40–45° C.

Example 5.—Di-piperidide of 21-triacontenoic acid and 1,4-di-4-piperidylbutane

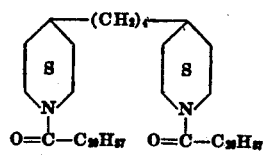

Into a flask equipped with a stirrer and a condenser there is placed a mixture of 122 grams of 1,4-di-4-piperidyl butane and 473 grams of 21-triacontenoic acid (commonly called lumequeic acid). The reaction mixture is heated, thereby causing it to liquefy. The heating is continued, with stirring, at a temperature of about 200–250° C. as long as water is evolved. When no more water is formed, the mixture is subjected to vacuum distillation conditions to remove any residual water and other readily volatile components. The residue, which is the di-piperidide of 21-triacontenoic acid and 1,4-di-4-piperidylbutane, is poured into a shallow pan and allowed to cool.

Example 6.—Dipiperidide of Emery 531 (T.M.) mixed fatty acid and 1,3-di-4-piperidylpropane The procedure of Example 1 is repeated with the exception that 280 grams of Emery 531 mixed fatty acid is used in place of the 284 grams of stearic acid. The resulting dipiperidide has a freezing point of about 37°–40° C.

The Emery 531 mixed fatty acid is a commercially available product. A typical analysis of it is:

| | Percent |
|---|---|
| Myristic | 3 |
| Pentadecanoic | 1.5 |
| Palmitic | 26.5 |
| Margaric | 1 |
| Stearic | 17 |
| Palmitoleic | 5 |
| Oleic | 42 |
| Linoleic | 3 |
| Linolenic | 1 |

Example 7.—Oleic acid-di-piperidide of 1,2-(5-ethylpiperidyl)-3,4-piperidylpropane

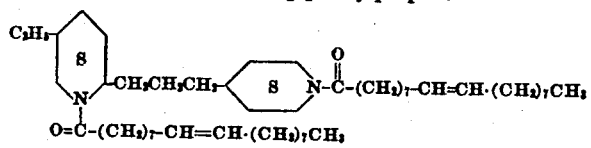

The procedure of Example 1 is repeated with the exception that we use as our reaction mixture 120 grams of 1,2-(5-ethylpiperidyl)-3,4-piperidylpropane, 285 grams of oleic acid, and 30 ml. toluene.

We claim as our invention:
1. Fatty acid di-piperidides of the formula:

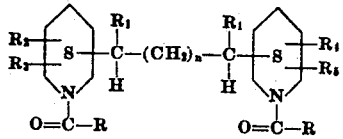

wherein R represents a member of the class consisting of alkyl and alkenyl radicals having from 9 to 29 carbon atoms; $R_1$, $R_2$, $R_3$, $R_4$, and $R_5$ represent a member of the class consisting of hydrogen and lower alkyl; $n$ is a small integer from 0 to 4.
2. N,N'-di-stearoyl-1,3-di-4-piperidylpropane.
3. N,N'-di-lauroyl-1,3-di-4-piperidylpropane.
4. N,N'-di-stearoyl-1,3-di-2-piperidylpropane.

References Cited
UNITED STATES PATENTS

| 3,219,612 | 11/1965 | Skau et al. | 260—294 |
| 3,277,101 | 10/1906 | Surrey | 260—294 |

JOHN D. RANDOLPH, *Primary Examiner.*

W. A. MODANCE, *Examiner.*

A. D. SPEVACK, *Assistant Examiner.*